(12) United States Patent
Bouron et al.

(10) Patent No.: US 8,790,021 B2
(45) Date of Patent: Jul. 29, 2014

(54) SPACER FOR TWIN-ROW ROLLING BEARING

(71) Applicants: Cyril Bouron, Avallon (FR); Jean-Baptiste Magny, Migé (FR); Pascal Ovize, Chitry le Fort (FR)

(72) Inventors: Cyril Bouron, Avallon (FR); Jean-Baptiste Magny, Migé (FR); Pascal Ovize, Chitry le Fort (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/766,897

(22) Filed: Feb. 14, 2013

(65) Prior Publication Data

US 2013/0223784 A1    Aug. 29, 2013

(30) Foreign Application Priority Data

Feb. 16, 2012 (EP) .................................. 12305177

(51) Int. Cl.
 *F16C 33/51*    (2006.01)
(52) U.S. Cl.
 USPC .......................................... 384/578; 384/623
(58) Field of Classification Search
 CPC ....... F16C 33/51; F16C 33/513; F16C 33/516
 USPC .................... 384/44, 578, 618–623
 See application file for complete search history.

(56) References Cited

U.S. PATENT DOCUMENTS 3,847,456 A * 11/1974 Schwarzbich ................ 384/620
3,938,866 A *  2/1976 Martin ........................... 384/623
3,966,284 A *  6/1976 Martin ........................... 384/623
4,861,171 A     8/1989 Adachi
6,779,923 B2 *  8/2004 Murata ........................... 384/44
2001/0038724 A1  11/2001 Murata

FOREIGN PATENT DOCUMENTS

| | | | |
|---|---|---|---|
| CH | 566489 A * | 9/1975 | |
| DE | 1989631 U | 7/1968 | |
| DE | 7317432 U | 5/1973 | |
| DE | 3245332 A * | 6/1984 | |
| DE | 3246348 A * | 6/1984 | |
| DE | 3620102 A1 | 12/1987 | |
| FR | 2222898 A5 | 10/1974 | |
| FR | 2600132 A1 | 12/1987 | |
| GB | 1469841 A | 4/1977 | |
| JP | 63123824 U | 8/1988 | |
| JP | 2004205029 A | 7/2004 | |
| JP | 2007100738 A | 4/2007 | |

* cited by examiner

*Primary Examiner* — Phillip A Johnson
(74) *Attorney, Agent, or Firm* — Bryan Peckjian; SKF USA Inc. Patent Department

(57) ABSTRACT

The spacer is adapted for a rolling bearing comprising an inner ring, an outer ring and at least two rows of contact rollers disposed between raceways provided on the rings. The spacer comprises opposite inner and outer portions facing one another, a first lateral portion extending transversally between the inner and outer portions and connected to the portions, and a second lateral portion facing the first lateral portion and extending from the outer portion towards the inner portion. The inner and outer portions delimit together with the lateral portions a pocket configured to receive at least two superposed contact rollers. A free edge of the second lateral portion defines with the inner portion an aperture in order to open laterally the pocket on the side opposite to the first lateral portion.

15 Claims, 3 Drawing Sheets

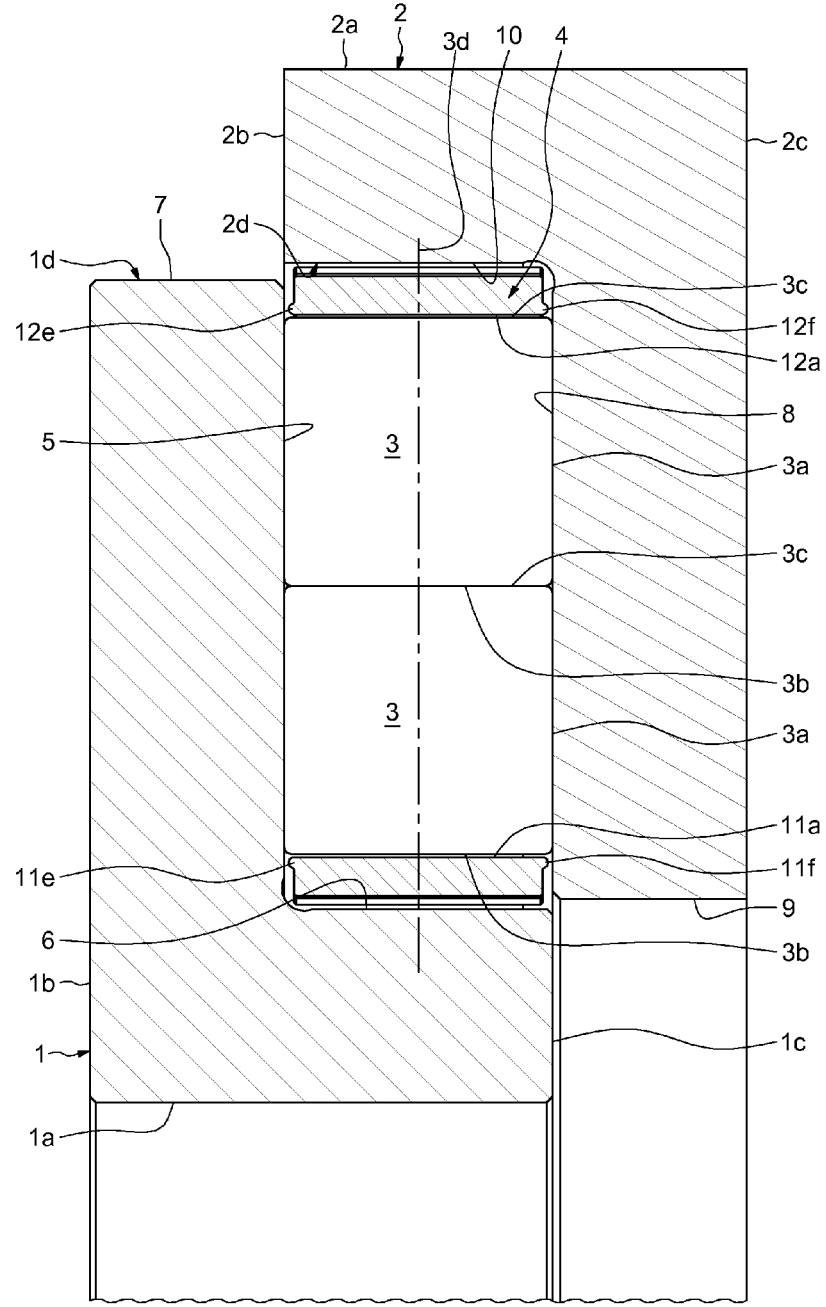

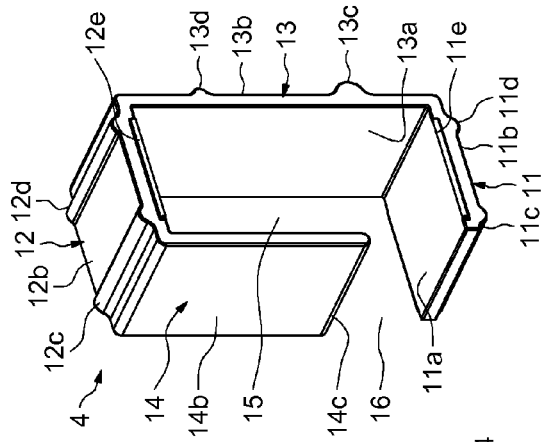
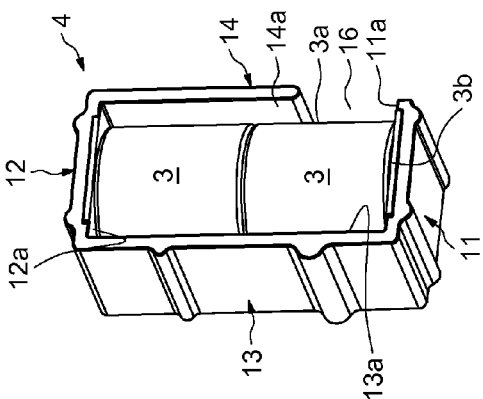
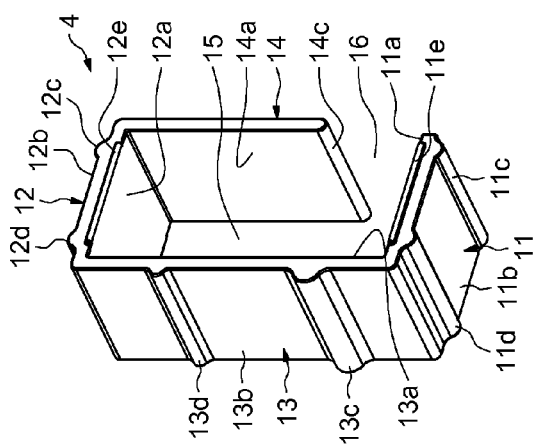

SPACER FOR TWIN-ROW ROLLING BEARING

CROSS-REFERENCE TO RELATED APPLICATION

This application claims priority to European patent application no. 12305177.3, filed on Feb. 16, 2012, the contents of which are fully herein incorporated by reference.

FIELD OF THE INVENTION

The present invention relates to the field of rolling bearings, in particular rolling bearings having an inner ring, an outer ring, and two or more rows of contact rollers therebetween. The invention relates more particularly to the field of large-diameter rolling bearings, notably those used in a tunnel boring machine.

BACKGROUND OF THE INVENTION

A large-diameter rolling bearing comprises generally two concentric inner and outer rings, at least a row of contact rollers arranged between raceways provided on the rings, and a plurality of spacers disposed circumferentially between the rollers. Such rolling bearings are generally loaded, both axially and radially, often with a relatively strong load.

French patent FR 2 222 898 relates to apertured spacers for rolling bearing which, by being assembled together, form a cage for the rollers. Each apertured spacer is of a substantially rectangular shape and is provided with a recess retaining the associated roller introduced by force through one aperture, the width of the aperture being less than the diameter of the roller. A convex boss is located at a lower corner of the spacer whereas a concave recess having a complementary shape is located at an opposite lower corner. Adjacent spacers are interengaged by virtue of the engagement of the boss of each spacer in the recess of the adjacent spacer.

With such spacers, the number of contact rollers which can be introduced between the rings of the rolling bearing is strongly limited. This leads to a low load bearing capacity as well as a limited service life.

One aim of the present invention is to overcome these drawbacks.

SUMMARY OF THE INVENTION

It is a particular object of the present invention to provide a spacer adapted to increase the load bearing capacity of the associated rolling bearing.

It is a particular object of the present invention to provide a spacer which is simple to manufacture, economic and having a good reliability.

It is a further object of the present invention to provide a spacer which can be mounted on several rolling bearing diameters with a same roller diameter.

In one embodiment, the spacer for rolling bearing comprising an inner ring, an outer ring and at least two rows of contact rollers disposed between raceways provided on the rings, comprises opposite inner and outer portions facing one another, a first lateral portion extending transversally between the inner and outer portions and connected to the portions, and a second lateral portion facing the first lateral portion and extending from the outer portion towards the inner portion 11. The inner and outer portions delimit together with the lateral portions a pocket configured to receive at least two superposed contact rollers. A free edge of the second lateral portion defines with the inner portion an aperture in order to open laterally the pocket on the side opposite to the first lateral portion.

The second lateral portion may comprise an inner surface forming a bearing surface for at least an exterior rolling surface of one of the rollers. Advantageously, the second lateral portion has a length at least equal to the length of one roller in order to recover the roller.

The inner and outer portions and the first lateral portion may have in cross-section the overall shape of a C.

Advantageously, the first lateral portion comprises an outer surface provided with at least a rib extending outwards and having a contact surface with an adjacent roller. The rib may be offset towards the inner portion with regard to the free edge of the second lateral portion. In one embodiment, the rib extends transversally on the outer surface. The rib may have in cross-section a profile in the shape of an arc of circle. The outer surface may be provided with two spaced ribs having advantageously different thicknesses.

The first lateral portion may comprise an inner surface forming a bearing surface for an exterior rolling surface of each of the roller.

Advantageously, the spacer is formed in one part from metal or from polymer material.

In another aspect of the invention, a rolling bearing comprises an inner ring, an outer ring, at least two rows of contact rollers disposed between raceways provided on the rings and a plurality of spacers as previously defined and disposed circumferentially between the rollers, the pocket of one spacer being laterally open towards the lateral portion of the adjacent separator.

In one embodiment, the inner and outer rings each comprise a guiding surface in contact with the inner portion and/or the outer portion of each spacer.

The rolling bearing as previously defined may be particularly useful as a bearing for a tunnel boring machine.

BRIEF DESCRIPTION OF THE DRAWINGS

The present invention and its advantages will be better understood by studying the detailed description of a specific embodiment given by way of non-limiting example and illustrated by the appended drawings on which:

FIG. 1 is a half section of a rolling bearing according to an example of the invention, FIGS. 2 and 3 are perspective views of a spacer of the rolling bearing of FIG. 1, FIG. 4 is a perspective view of the spacer of FIGS. 2 and 3 with its associated rollers.

DETAILED DESCRIPTION OF THE INVENTION

Figure 5:
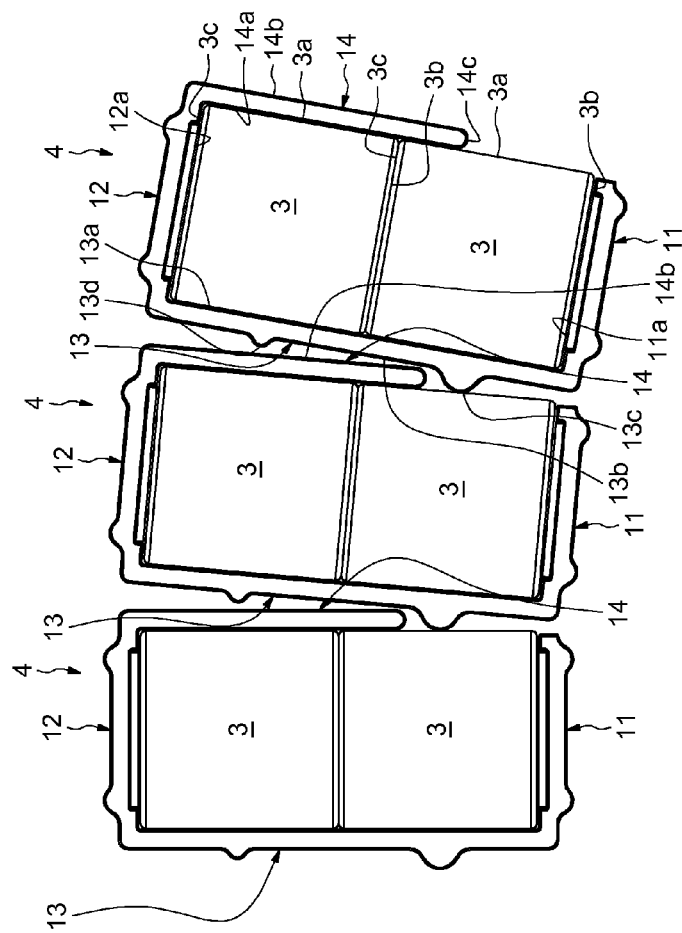
FIG. 5 is a side view showing three spacers and the associated rollers as mounted in the rolling bearing.

The rolling bearing as illustrated on the FIG. 1 is a large-diameter rolling bearing comprising an inner ring 1 and an outer ring 2 between which is housed two rows of contact rollers 3 which lie on different radii. The twin-row rolling bearing also comprises a plurality of spacers 4 disposed circumferentially between the rollers 3 to maintain their circumferential spacing. Each spacer 4 maintains one pair of two superposed rollers 3.

The inner and outer rings 1, 2 are concentric and extend axially along the bearing rotation axis (not shown) of the rolling bearing. The rings 1, 2 are of the solid type. A "solid ring" is to be understood as a ring obtained by machining with removal of material (by machining, grinding) from metal tube stock, bar stock, rough forgings and/or rolled blanks.

The rollers 3 of each row are identical with one another and each comprise an exterior rolling surface 3a and opposite end transverse faces 3b, 3c delimiting axially the rolling surface. In the illustrated embodiment, the rolling surface 3a of each roller has a cylindrical profile. Alternatively, the rolling surfaces may have a spherical profile or a logarithmic profile. In the illustrated embodiment, the angle between the rotation axis 3d of each roller and the bearing axis is equal to 90°. The rotation axis 3d of each roller extends radially. For each spacer 4, the two associated rollers 3 are mounted axially in contact to one another with regard to their common rotation axis 3d to obtain two superposed rollers. The upper end face 3c of the lower roller bears against the lower end face 3b of the upper roller.

The inner ring 1 has a bore 1a of cylindrical shape designed to be fixed to a chassis or to a structure of machine (not shown) and delimited by opposite radial lateral surfaces 1b, 1c. The inner ring 1 also comprises a stepped exterior cylindrical surface 1d onto which an annular radial raceway 5 is formed. The raceway 5 has in cross-section a straight internal profile in contact with the rolling surfaces 3a of the two rows of rollers 3. The raceway 5 is formed by the radial surface provided between a first axial surface 6 of small-diameter and a second axial surface 7 of large-diameter of the stepped exterior cylindrical surface 1d. As will be described later, the axial surface 6 forms an annular guiding surface which may be in radial contact with the spacers 4. The axial guiding surface 6 is straight, disposed perpendicular to the raceway 5 and connected to the edge of small-diameter of the raceway by an annular concave fillet. The guiding surface 6 extends axially from the edge and is connected to the radial surface 1c of the inner ring. The guiding surface 6 and the raceway 5 of the inner ring delimit an annular groove.

The outer ring 2 comprises an outer cylindrical surface 2a delimited by opposite radial lateral surfaces 2b, 2c. The outer ring 2 also comprises a stepped annular bore 2d of cylindrical shape into which an annular radial raceway 8 is formed. The raceway 8 has in cross-section a straight internal profile in contact with the rolling surfaces 3a of the two rows of rollers 3. The raceway 5 of the inner ring and the raceway 8 of the outer ring axially face each other and are parallel. The raceway 8 is formed by the radial surface provided between a first axial surface 9 of small-diameter and a second axial surface 10 of large-diameter of the stepped bore 2d. As will be described later, the axial surface 10 forms an annular guiding surface which may be in radial contact with the spacers 4. The guiding surface 10 of the outer ring and the guiding surface 6 of the inner ring radially face each other and are parallel. The guiding surface 10 is straight, disposed perpendicular to the raceway 8 and connected to the edge of large-diameter of the raceway by an annular concave fillet. The guiding surface 10 extends axially from the edge and is connected to the radial surface 2b of the outer ring. The guiding surface 10 and the raceway 8 of the outer ring delimit an annular groove.

The raceway 5 and the guiding surface 6 of the inner ring define together with the raceway 8 and the guiding surface 10 of the outer ring an annular space inside which the two rows of rollers 3 and the spacers 4 are disposed. Each pair of superposed rollers 3 arranged between the raceways 5, 8 is maintained by the associated spacer 4 which may bear against the guiding surfaces 6, 10 and the raceways 5, 8.

The spacers 4 are identical with one another and each placed between two consecutive pairs of stacked rollers 3. The spacers 4 may be made in one part from metal or bronze. Alternatively, the spacers 4 may be made from polymer material such as polyamide, for instance by molding.

As shown on FIGS. 2 to 4, each spacer 4 comprises two parallel inner and outer portions 11, 12 adapted to come into contact with the facing guiding surfaces and the raceways of the inner and outer rings, and a first lateral portion 13 extending transversally between the opposite portions 11, 12 and adapted to be located circumferentially between two adjacent rollers 3. Each spacer 4 further comprises a second lateral portion 14 extending transversally from the outer portion 12 towards the inner portion 11 and facing the first lateral portion 13. The first and second lateral portions 13, 14 are parallel to one another. The first lateral portion 13 is connected to a lateral edge of the inner portion 11 and to the opposite facing edge of the outer portion 12. The inner and outer portions 11, 12 and the first lateral portion 13 have in cross-section the overall shape of a C. The second lateral portion 14 extends from the edge of the outer portion 12 located on the side opposite to the first lateral portion 13. The lateral portion 14 extends towards the inner portion 11 while remaining distant from the latter. The inner and outer portions 11, 12 and the lateral portions 13, 14 each have a rectangular shape with similar width and thickness. The width of the inner and outer portions 11, 12 and the lateral portions 13, 14 is slightly smaller than the radius of the rollers 3.

As shown on FIG. 1, the raceways 5, 8 and the guiding surface 6, 10 of the inner and outer rings each form a flank having a direct contact surface with the inner and outer parts 11, 12 of each spacer to have a slight relative sliding between each spacer 4 and the rings 1, 2. In order to limit the induced friction torque of the spacers 4, slight axial clearances are foreseen between each spacer and the raceways 5, 8 of the rings and slight radial clearances are foreseen between each spacer and the guiding surface 6, 10.

Referring once again to FIGS. 2 to 4, the inner and outer portions 11, 12 and the opposite first and second lateral portions 13, 14 delimit a pocket 15 for receiving two superimposed rollers 3. An opening or aperture 16 is defined between the second lateral portion 14 and the inner portion 11 as will be described later. The pocket 15 is laterally open on the side opposite to the first lateral portion 13 between the inner portion 11 and the second lateral portion 14. In the mounted position of the spacer 4 into the rolling bearing, the pocket 15 is delimited in the circumferential direction by the first and second lateral portions 13, 14 and is delimited in the radial direction by the inner and outer portions 11, 12. In this mounted position, the pocket 15 of one spacer 4 is circumferentially open towards the adjacent spacer 4 with the aperture 16. The pocket 15 of each spacer 4 is open both axially in the two directions and circumferentially in one direction. The pocket 15 is open on three sides. With regard to the common rotation axis 3d of the superposed rollers 3 held into the pocket 15 of each spacer, the inner and outer portions 11, 12 extend radially, the first and second lateral portions 13, 14 extend axially between the portions and the pocket 15 is radially open toward the outside. The aperture 16 is delimited axially by the inner portion 11 and the lateral portion 14.

The inner and outer portions 11, 12 of each spacer have inner planar contact surfaces 11a, 12a facing each other and forming respectively a bearing surface for the end face 3b of the lower roller of the pair of superposed rollers and for the end face 3c of the upper roller. The gap between the planar contact surfaces 11a, 12a is substantially equal to twice the length of one roller 3. The first lateral portion 13 comprises an inner planar contact surface 13a forming a bearing surface for the rolling surface 3a of each of the two superposed rollers.

The second lateral portion 14 of each spacer comprises an inner planar contact surface 14a facing the contact surface 13a of the lateral portion 13 and forming a bearing surface for the upper and lower rollers 3. In the disclosed embodiment, the lateral portion 14 has a length greater than the length of the upper roller 3 in order to extend beyond the zone of contact between the upper roller 3 and the lower roller. Accordingly, the inner contact surface 14a also forms a bearing surface for the rolling surface 3a of the lower roller 3. The lateral portion 14 recovers the entire length of the upper roller 3 and recovers partly the lower roller 3. The lateral portion 14 is adapted to interfere with the lower roller 3 in order to avoid an escape from the open pocket 15. In the mounted position of the spacer 4 into the rolling bearing, the inner and outer portions 11, 12 maintain the upper and lower superposed rollers 3 in the radial direction, and the lateral portions 13, 14 maintain the rollers 3 in the circumferential direction.

The lateral portion 14 of each spacer also comprises a planar outer surface 14b facing the lateral portion 13 of the adjacent spacer in the mounted position into the rolling bearing as will be described later. A free end 14c of the lateral portion 14 defines with the free edge of the inner portion 11 the aperture 16 to open laterally the pocket 15 on the side opposite to the first lateral portion 13. The free edge 14c of the second lateral portion 14 remains distant from the inner portion 11 to delimit the aperture 16. The length of the aperture 16 is smaller than the length of one roller 3.

The inner portion 11 of each spacer also comprises a planar outer surface 11b and two spaced guiding ribs 11c, 11d provided on the outer surface. The guiding ribs 11c, 11d protrude outwards relative to the outer surface 11b and extend transversally on the outer surface from a longitudinal edge of the inner portion 11 to an opposite longitudinal edge. The opposite longitudinal edges delimit the outer surface 11b. In the disclosed embodiment, the guiding ribs 11c, 11d are identical to one another and have in cross-section a profile in the shape of an arc of circle. Here, the rib 11c is located near to the free edge of the inner portion 11 while the rib 11d is located near to the edge of the inner portion 11 linked to the first lateral portion 13.

In the mounted position of the spacer 4 into the rolling bearing, the planar outer surface 11b of the inner portion 11 faces the guiding surface 6 of the inner ring while remaining distant from the latter, and the guiding ribs 11c, 11d may come into contact with the guiding surface 6. With the protruding guiding ribs 11c and 11d, the friction contacts between the inner part 11 of each spacer and the associated guiding surface 6 of the inner ring are reduced. Besides, there is a linear contact between each guiding rib 11c, 11d and the guiding surface 6. With such a contact, there is less friction between each spacer 4 and the inner ring 1.

The inner portion 11 of each spacer further comprises two lateral guiding flanges 11e, 11f each providing on one of the longitudinal edges of the inner portion. Each guiding flange 11e, 11f protrudes outwards from the associated longitudinal edge. In the disclosed embodiment, the guiding flanges 11e, 11f are identical to one another, extend longitudinally between the ribs 11c, 11d and have in cross-section a profile in the shape of an arc of circle.

In the mounted position of the spacer 4 into the rolling bearing, the lateral guiding flange 11e axially faces the raceway 5 of the inner ring while the other lateral guiding flange 11f axially faces the raceway 8 of the outer ring. If an axial contact appears between the spacer 4 and the inner or outer ring, with the protruding guiding flanges 11e and 11f, the friction contacts between the inner portion 11 of each spacer and the raceway 5 or 8 are reduced. Besides, the contact between each guiding flange 11e, 11f and the associated raceway 5, 8 is linear. With such a contact, there is less friction between each spacer 4 and the inner and outer rings 1, 2.

Since the inner and outer portions 11, 12 of each spacer are similar in the illustrated embodiment, only one of them is described here in detail, it being understood that the references "a, b, c, d, e and f" previously used for the inner part 11 are also used for the identical elements of the outer part 12. Similarly to the inner portion 11 of the spacer with regard to the guiding surface 6 of the inner ring, with the protruding guiding ribs 12c, 12d of the outer portion, the friction contacts between the outer part 12 of each spacer and the associated guiding surface 10 of the outer ring are reduced. Besides, there is a linear contact between each guiding rib 12c, 12d and the guiding surface 10.

The first lateral portion 13 of each spacer comprises a planar outer surface 13b and two spaced guiding ribs 13c, 13d provided on the outer surface. The guiding ribs 13c, 13d protrude outwards relative to the outer surface 13b and extend transversally on the outer surface from a longitudinal edge of the lateral portion 13 to an opposite longitudinal edge. The opposite longitudinal edges delimit the outer surface 13b. The ribs 13c, 13d have in cross-section a profile in the shape of an arc of circle. In the disclosed embodiment, the ribs 13c, 13d have different thicknesses in order to be used for rolling bearings having different diameters. The rib 13c having the smaller thickness is located near to the edge of the lateral portion 13 linked to the inner portion 11. The rib 13c is offset towards the inner portion 11 with regard to the free edge 14c of the lateral portion 14. The rib 13d is located near to the edge of the lateral portion 13 linked to the outer portion 12.

In the mounted position of the spacers 4 into the rolling bearing as shown on FIG. 5, the guiding rib 13c of one spacer 4 protrudes through the aperture 16 of the adjacent spacer 4 since the pocket of the spacer is laterally open towards the lateral portion 13 of the considered spacer. The guiding rib 13c extends into the aperture 16 and bears against the rolling surface 3a of the lower roller 3 which is housed into the adjacent spacer 4. There is a direct contact between the guiding rib 13c of the lateral portion of one spacer and the adjacent lower roller 3 supported by the successive spacer 4 in the circumferential direction. In the mounted position, the pocket 15 of each spacer enables to reduce the circumferential space between two successive lower rollers 3. Accordingly, the number of rollers 3 disposed between the inner and outer rings 1 and 2 may be increased. This leads to higher load bearing capacity of the rolling bearing as well as an increase of the service life.

In the mounted position of the spacers 4, when the rollers 3 of one spacer 4 rotate around the common rotation axis, the rib 13c of the adjacent spacer which comes into contact with the rolling surface 3a of the lower roller act as a guiding means for the roller. Each lower roller 3 is maintained radially by the inner portion 11 of the spacer 4 and the associated upper roller and circumferentially by the lateral portions 13, 14 of the spacer 4 and the guiding rib 13c of the adjacent spacer 4. Each upper roller 3 is maintained radially by the outer portion 12 of the spacer and the associated lower roller and circumferentially by the lateral portions 13, 14. With the protruding guiding rib 13c, the friction contacts between the lower roller 3 disposed into the pocket of one spacer and the lateral portion 13 of the adjacent spacer 4 are reduced. Besides, there is a linear contact between these elements. With such a contact, there is less friction.

During use, the inner and outer portions 11, 12 of each spacer 4 disposed axially between the raceways 5, 8 of the inner and outer rings may come respectively into contact with the guiding surfaces 6, 10 of the rings to guide the spacer and the associated rollers 3 while the guiding rib 13c of the spacer bears against the lower roller 3 which is housed into the adjacent spacer. When the guiding ribs 11c, 11d or 12c, 12d of the spacer come into contact with the associated guiding surface of the rings, both the spacer 4 and the associated rollers 3 may slightly pivot around one of the guiding ribs in contact with the guiding surface in order to follow the path of the raceways 5, 8 of the rings. Such a rotation is also made possible with the contact of the guiding rib 13c with the adjacent lower roller 3. The spacer 4 and the associated rollers 3 may also pivot around the guiding rib 13c. Accordingly, the sliding of the rollers 3 along the raceways 5, 8 of the rings is enhanced and the stress level on each spacer 4 is reduced. Otherwise, the guiding ribs 11c, 11d, 12c, 12d of each spacer enable to avoid a high skewing or tilting of the rollers 3.

In the disclosed embodiment, only the lower rib 13c of each spacer comes into contact with the rolling surface 3a of the adjacent lower roller 3, the guiding rib 13d facing the outer surface 14b of the lateral portion 14 of the adjacent spacer which remaining distant from the latter. In case of a rolling bearing having a larger diameter and using the same rollers 3 and spacers 4, the lower rib 13c of each spacer may come into contact with the adjacent lower roller 3 and the upper rib 13d may come into contact with the outer surface 14b of the lateral portion of the adjacent spacer 4. Alternatively, only the upper rib 13d of each spacer may come into contact with the outer surface 14b of the lateral portion of the adjacent spacer 4 and the lower rib 13c may remain distant from the rolling surface 3a of the adjacent lower roller 3.

The general structure of each spacer 4 is lightened by the provision of a pocket 15 defined by four portions or lugs and open in the circumferential direction towards the outside on the side opposite to the lateral portion 13. A weight reduction for each spacer 4 is thus obtained. The friction contribution of each spacer 4 with regard to the inner and outer rings 1, 2 is reduced by the presence of the ribs 11c to 11f and the ribs 12c to 12f. Similarly, the friction contribution of each spacer 4 with the roller located into the adjacent spacer is also reduced by the presence of the ribs 13a, 13b. The ribs 11c to 11f, 12c to 12f, 13c and 13d of each spacer 4 also improve the guiding of the rollers 3 along the raceways 5, 8 of the rings. Alternatively, it may however be possible to not foresee the ribs on each spacer.

Although the invention has been illustrated on the basis of a rolling bearing having a double row of superposed contact rollers, it should be understood that the invention can be applied to bearings having more rows of rollers. Otherwise, in the illustrated embodiment, the rolling bearing is adapted to accommodate axial loads. Alternatively, it may also be possible to have a rolling bearing adapted to accommodate radial loads or both axial and radial loads. Furthermore, the inner ring and/or the outer ring may comprise gearing teeth on their outer periphery, so as to be connected to driving gears for instance connected to the output shaft of a motor.

The invention claimed is:

1. A spacer for a rolling bearing, the rolling bearing having an inner ring, an outer ring and at least two rows of contact rollers disposed between raceways provided on the rings, the spacer comprising:
   opposite inner and outer portions facing one another,
   a first lateral portion extending transversally between the inner and outer portions and connected to the inner and outer portions, and
   a second lateral portion facing the first lateral portion and extending from the outer portion towards the inner portion, wherein
   the inner and outer portions delimiting together with the lateral portions a pocket configured to receive at least two superposed contact rollers, and wherein
   the inner and outer portions each provide a contact surface with an end face of one of the rollers, a free edge of the second lateral portion defining with the inner portion an aperture in order to laterally open the pocket on the side opposite to the first lateral portion.

2. The spacer according to claim 1, wherein the second lateral portion further comprises an inner surface forming a bearing surface for at least an exterior rolling surface of one of the rollers.

3. The spacer according to claim 2, wherein the second lateral portion has a length at least equal to the length of one roller in order to recover the roller.

4. The spacer according to claim 1, wherein the inner and outer portions and the first lateral portion have in cross-section the overall shape of a C.

5. The spacer according to claim 1, wherein the first lateral portion further comprises an outer surface provided with at least one rib extending outwards.

6. The spacer according to claim 5, wherein the rib is offset towards the inner portion with respect to the free edge of the second lateral portion.

7. The spacer according to claim 5, wherein the rib extends transversally on the outer surface.

8. The spacer according to claim 5, wherein the rib has in cross-section a profile in the shape of an arc of circle.

9. The spacer according to claim 5, wherein the outer surface is provided with two spaced ribs.

10. The spacer according to claim 9, wherein the ribs have different thicknesses.

11. The spacer according to claim 1, wherein the first lateral portion further comprises an inner surface forming a bearing surface for an exterior rolling surface of each of the rollers.

12. Spacer according to claim 1, further comprising being formed in one part from metal or from polymer material.

13. A rolling bearing comprising:
   an inner ring,
   an outer ring,
   at least two rows of contact rollers disposed between raceways provided on the rings and a plurality of spacers disposed circumferentially between the rollers, the plurality of spacers comprising:
      opposite inner and outer portions facing one another,
      a first lateral portion extending transversally between the inner and outer portions and connected to the inner and outer portions, and
      a second lateral portion facing the first lateral portion and extending from the outer portion towards the inner portion, wherein
      the inner and outer portions delimiting together with the lateral portions a pocket configured to receive at least two superposed contact rollers, and wherein
      the inner and outer portions each provide a contact surface with an end face of one of the rollers, a free edge of the second lateral portion defining with the inner portion an aperture in order to laterally open the pocket on the side opposite to the first lateral portion, and wherein
   the pocket of one spacer being laterally open towards the first lateral portion of the adjacent separator.

14. The rolling bearing according to claim 13, wherein the inner and outer rings each comprise a guiding surface in contact with at least one of the inner portion and the outer portion of each spacer.

15. A tunnel boring machine including a rolling bearing and a plurality of spacers, the rolling bearing providing an inner ring, an outer ring, at least two rows of contact rollers disposed between raceways provided on the rings, the plurality of spacers disposed circumferentially between the rollers, and having opposite inner and outer portions facing one another, a first lateral portion extending transversally between the inner and outer portions and connected to the inner and outer portions, and a second lateral portion facing the first lateral portion and extending from the outer portion towards the inner portion, wherein the inner and outer portions delimiting together with the lateral portions a pocket configured to receive at least two superposed contact rollers, and wherein the inner and outer portions each provide a contact surface with an end face of one of the rollers, a free edge of the second lateral portion defining with the inner portion an aperture in order to laterally open the pocket on the side opposite to the first lateral portion, and wherein the pocket of one spacer being laterally open towards the first lateral portion of the adjacent separator.

* * * * *